United States Patent
Olson

(10) Patent No.: US 8,041,011 B2
(45) Date of Patent: *Oct. 18, 2011

(54) DEVICE AND METHOD FOR SUPPRESSING DSL SIGNAL ECHO INDUCED BY BRIDGETAP

(75) Inventor: Gregory David Olson, Plano, TX (US)

(73) Assignee: AT&T Labs, Inc., Austin, TX (US)

( * ) Notice: Subject to any disclaimer, the term of this patent is extended or adjusted under 35 U.S.C. 154(b) by 1398 days.

This patent is subject to a terminal disclaimer.

(21) Appl. No.: 11/536,113

(22) Filed: Sep. 28, 2006

(65) Prior Publication Data
US 2007/0121927 A1    May 31, 2007

Related U.S. Application Data

(63) Continuation of application No. 09/597,154, filed on Jun. 20, 2000, now Pat. No. 7,139,392.

(51) Int. Cl.
*H04M 1/24* (2006.01)
*H04M 3/08* (2006.01)
*H04M 3/22* (2006.01)

(52) U.S. Cl. .......................... 379/30; 379/398

(58) Field of Classification Search .............. 379/45, 379/30, 398
See application file for complete search history.

(56) References Cited

U.S. PATENT DOCUMENTS

| | | | |
|---|---|---|---|
| 3,459,942 A * | 8/1969 | Anderson | ............ 372/38.1 |
| 4,348,669 A | 9/1982 | Braun | |
| 4,622,442 A | 11/1986 | Martin | |
| 5,093,856 A | 3/1992 | Atkinson et al. | |
| 5,153,875 A | 10/1992 | Takatori | |
| 5,210,374 A * | 5/1993 | Channell | ............ 174/38 |
| 5,446,728 A | 8/1995 | Löfmark | |
| 5,757,803 A | 5/1998 | Russell et al. | |
| 5,896,390 A | 4/1999 | Williams | |
| 5,929,402 A | 7/1999 | Charles et al. | |
| 6,240,178 B1 | 5/2001 | Pett et al. | |
| 6,314,181 B1 * | 11/2001 | Pett | ............ 379/398 |
| 6,389,109 B1 | 5/2002 | Schmidt et al. | |

FOREIGN PATENT DOCUMENTS

WO       00/33556       6/2000

OTHER PUBLICATIONS

Federal Telephone and Radio Corp., "Reference Data for Radio Engineers", 1943, p. 111.
Federal Telephone and Radio Corp., Reference Data for Radio Engineers, 1943, p. 111.
Impedance and Impedance Matching, National Instruments, http://zone.ni.com/devzone/conceptd.nsf/webmain/EAF49A89CF5014C186256F2700114FC9. Sep. 6, 2006.

* cited by examiner

*Primary Examiner* — Alexander Jamal

(74) *Attorney, Agent, or Firm* — Greenblum & Bernstein, P.L.C.

(57) ABSTRACT

A digital signal line echo reduction adaptor is configured to connect adjacent to a first end of a bridgetap line. The bridgetap line has a second end connected to a carrier communication line. The digital signal line echo reduction adaptor reduces an effect of echo from the bridgetap line on a rate of data transmission over the carrier communication line.

20 Claims, 3 Drawing Sheets

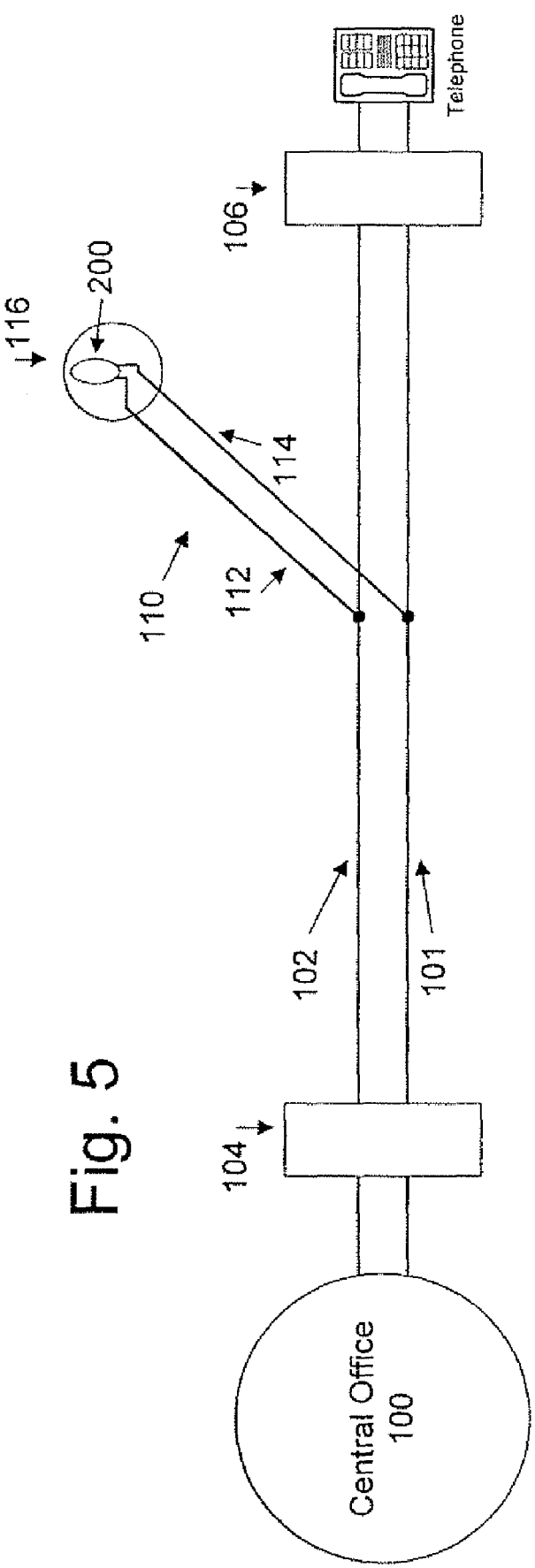

DEVICE AND METHOD FOR SUPPRESSING DSL SIGNAL ECHO INDUCED BY BRIDGETAP

CROSS-REFERENCE TO RELATED APPLICATION

The present application is a continuation application of pending U.S. patent application Ser. No. 09/597,154, filed on Jun. 20, 2000, the content of which is expressly incorporated by reference herein in its entirety.

BACKGROUND OF THE INVENTION

1. Field of the Invention

The present invention relates to a system for improving DSL transmission rates over standard telephone lines. More specifically, the present invention is directed to a device and method that reduces the effect of echos/reflections from bridgetap telephone lines to thereby improve the DSL transmission over a standard telephone line.

2. Discussion of Background Information

Homes and businesses in the U.S. connect to local telephone providers through a network of wire connections, many of which are underground. To provide alternative uses for the lines, many of these connections include "bridgetap" lines, which include a pair of wires spliced into the main line that extend away from the main line. An example of such a circuit is shown in FIG. 1. A Central Office ("CO") frame 100 connects through a pair of tip and ring wires 101 and 102 (typically 19-26 gauge wires, preferably 24-26) to a cross connect box 104. Tip and ring wires 101 and 102 continue from box 104 underground to a first terminal 106 at a user's location, to which a standard telephone can be connected. A first end of a bridgetap 110, which includes a pair of tip and ring wires 112 and 114, electrically connect in parallel with tip and ring wires 101 and 102 at points A and B, respectively. A second end of bridgetap 110 terminates as an open circuit some distance away (based on the length of the bridgetap wires).

When the tip and ring wires 101 and 102 are installed underground, the connection points A and B at the first end of bridgetap 110 are also typically underground. The opposite end of bridgetap 110 is typically above-ground at a telephone junction 116, with the intention of having such ends available to connect to another terminal.

By its very nature, some of the energy of a transmission over tip and ring lines 101 and 102 will split into the bridgetap 110 and produce an echo signal. However, the effect of such an echo is negligible at the low frequencies of voice communication over a telephone network. Thus, for the many years that such networks have been installed, the value of bridgetaps have far exceeded their drawbacks, such that they can be found throughout the telephone networks of every telephone carrier in the U.S.

In recent years, the increase in Internet use has developed a market for high speed Internet access. One such type of high speed access is a digital subscriber line ("DSL"), which uses the existing telephone lines to transmit data at high frequencies well outside the low frequency voice range. However, the effect of bridgetap echo can be far more significant at such high frequencies, particularly in the downstream direction (i.e., from CO frame 100 to terminal 106). Specifically, when the length of bridgetap 110 approaches the resonance frequency of the bridgetap (i.e., $(\lambda/4)90°$), bridgetap 110 becomes the circuit equivalent of a series connection of an inductor and a capacitor, which results in a very low resistance and low impedance. Based on the resulting resonance characteristics, the bridgetap will create/reflect a significant echo in the downstream direction of data transmission. If the connections A and B are within approximately 1000 feet from terminal 106, the echo can significantly decrease the S/N ratio of the transmission, which in turn decreases the downstream data transmission rate.

Based on the resonance characteristics of standard telephone lines, signal degradation will define a generally bell shaped curve between 250-650 feet, with maximum losses between 300 and 500 feet. Tests have shown that, for a connection with a downstream transmission rate of 2.3 Mb/s without bridgetap, the addition of 300 feet of bridgetap cable spliced into the main line 1000 feet from a user reduced the downstream transmission rates from 2.3 Mb/s to between 1.48-1.51 Mb/s. These losses may result in a downstream transmission rate that is below FCC minimums, such that the DSL provider will be forced to deny service to such a user absent corrective measures.

At present, the only way to effectively eliminate the effects of bridgetap 110 is to sever it from the main line near points A and B. Since most bridgetaps are underground, this requires a crew of men and equipment to dig up the lines near connection points A and B to cut the bridgetap off. The assignee of the present invention currently charges approximately $900 for this service. Further, once cut, the bridgetap cannot be used absent reattachment, and essentially becomes waste underground cable.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 5 is a schematic diagram of the adaptor of the present invention in a telephone network.

DETAILED DESCRIPTION OF THE EXEMPLARY EMBODIMENT

Figure 1:
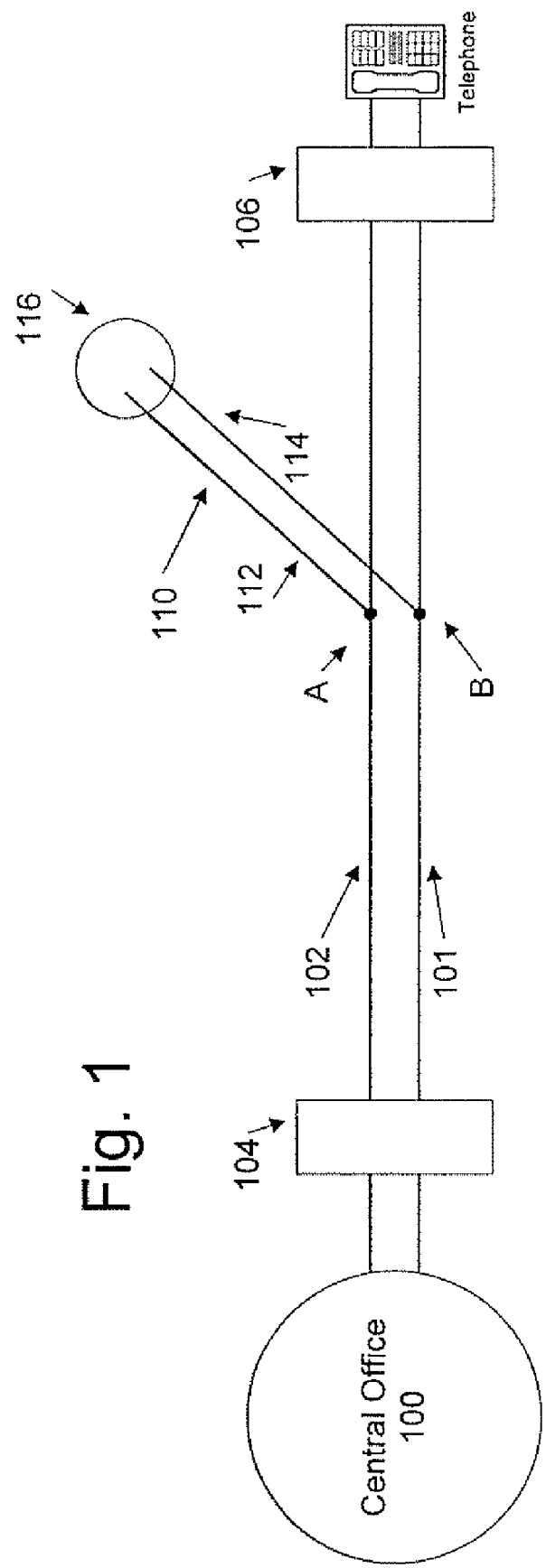
FIG. 1 is a schematic drawing of a telephone network of the prior art.

It is accordingly an object of the present invention to overcome the drawbacks of the prior art.

It is a further object of the invention to provide an inexpensive device and method for reducing the effects of bridgetap echo on DSL transmission rates.

It is still a further object of the invention to provide a device and method for reducing the effects of bridgetap echo on DSL transmission at the exposed distal end of the bridgetap itself.

The present invention is directed to an adaptor that is connected to the exposed above-ground end of the bridgetap. The adaptor includes a capacitance (including at least one capacitor) with a sufficient voltage rating to withstand outdoor use. When connected to the open ends of the bridgetap, the resonance characteristics of the bridgetap change to that of a much longer cable, and particularly a length of cable that is outside the range that induces substantial echoes.

According to an embodiment of the present invention, a digital signal line transmission system with reduced echo is provided. A communication line is between a carrier and a user terminal. A bridgetap line has a first end connected to the communication line. An adaptor having a capacitance is connected to the bridgetap line. The adaptor reduces the effect of echo from the bridgetap line on a rate of data transmission to the user terminal over the communication line.

Various features of the above embodiment include that the capacitance is between approximately 0.04-2.0 mf, preferably approximately 0.05 mf or 0.068 mf. A length of the bridgetap line is preferably between approximately 250-650 feet. The adaptor changes a resonance characteristic of the bridgetap line to that of a bridgetap line that is at least approximately 300 feet longer, and preferably 400 feet. The bridgetap preferably splices into the communication line within approximately 1000 feet from user terminal. The adaptor preferably improves the rate by at least approximately 300 kb/s, and particularly by approximately 300-566 kb/s. The capacitance preferably has a voltage rating of at least 150 v. The adaptor is preferably water-tight, and preferably connected adjacent to a second end of the bridgetap.

According to another embodiment of the invention, a digital signal line transmission system with reduced echo is provided. A communication line is between a carrier and a user terminal. A bridgetap line has a first end spliced into the communication line, the bridgetap line having a length between approximately 250-650 feet. An adaptor is connected adjacent to a second end of the bridgetap line. The adaptor has a capacitance of 0.04-2.0 mf, is water-tight and has a sufficient voltage rating to withstand being struck by lightning. The adaptor reduces the effect of echo from the bridgetap line on a rate of data transmission to the user terminal over the communication line.

Various features of the above embodiment include that the capacitance is preferably 0.05 mf or 0.068 mf. The adaptor preferably changes a resonance characteristic of the bridgetap line to that of bridgetap line that is at least approximately 300 feet longer, and preferably 400 feet. The bridgetap preferably splices into the communication line within approximately 1000 feet from the user terminal. The adaptor preferably improves the rate by at least approximately 300 kb/s, and particularly by approximately 300-566 kb/s.

According to yet another embodiment of the invention, method for providing digital signal line service is provided. A communication line between a carrier and a user terminal is identified. A bridgetap line connected to the communication line is identified. A resonance characteristic of the bridgetap line is changed to that of a bridgetap line longer than 650 feet. Digital signal line service is preferably provided to the user terminal.

According to still yet another embodiment of the invention, a method for providing digital signal line service is provided. A communication line between a carrier and a user terminal is identified. A bridgetap extending between approximately 250-650 feet from the communication line is identified. A portion of the bridgetap is connected adjacent an end thereof with an adaptor having capacitance between approximately 0.04-2.0 mf. Digital signal line service is preferably provided to the user terminal.

Other exemplary embodiments and advantages of the present invention may be ascertained by reviewing the present disclosure and the accompanying drawings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 2:
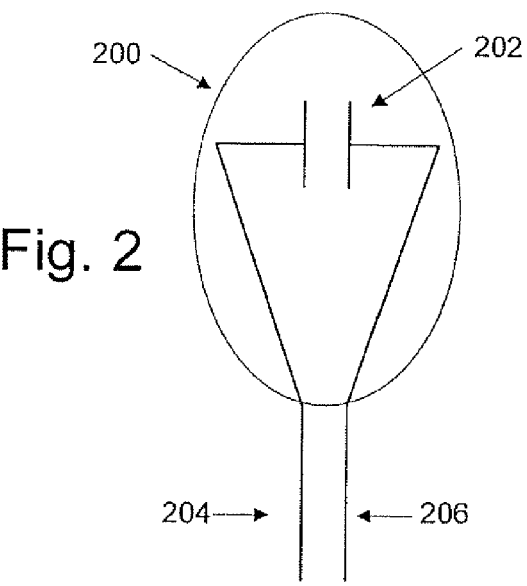
FIG. 2 is a schematic drawing of an adaptor of an embodiment of the present invention.

Referring now to FIG. 2, an adaptor 200 includes a capacitor 202 in series with terminals 204 and 206. As seen in FIG. 5, terminals 204 and 206 connect to the open circuit of bridgetap 110. Adaptor 200 is preferably sealed in a water-tight enclosure for protection of the circuit elements from the external environment.

Capacitor 202 has a capacitance sufficient to change the resonance characteristics of the bridgetap 110 from a length of X feet to a length of at least X+300 feet, and preferably X+400 feet. In other words, even though the length of bridgetap remains the same length, its resonance characteristics will change to simulate that of a much longer bridgetap. A capacitance between approximately 0.040-2.0 mf will achieve that result. If bridgetap lines 112 and 114 are 24 gauge wire, then a capacitance of 0.050 mf is preferred. For 26 gauge wire, a capacitance of 0.068 mf is preferred.

When adaptor 200 is connected to a telephone network such as in FIG. 5, capacitor 202 will change the resonance characteristics of bridgetap 110 to that of a longer bridgetap. Thus, by way of non-limiting example, a 300-foot bridgetap (which is close enough to the resonance frequency to causes significant losses) will experience a change in resonance frequency to the equivalent of an approximately 700-foot bridgetap. Since a 700-foot bridgetap is sufficiently longer than the 250-650 foot length which triggers substantial echo, the resulting echo will not have as great an effect on the downstream transmission rate.

The adaptor 200 according to the above embodiment was tested under laboratory conditions for a 300-foot bridgetap located 1000 feet from the end terminal. Absent the adaptor, the 300 feet of bridgetap reduced the downstream transmission rate from approximately 2.3 Mb/s to between 1.48-1.51 Mb/s. When the adaptor 200 was installed, the downstream transmission rate increased to between approximately 1.94-1.98 Mb/s. Although not as high as transmission rates without any bridgetap, this increase would be sufficient to provide DSL service to users who were formerly denied services due to the slower transmission rates caused by echos. The present invention includes providing DSL service with the aid of adaptor 200.

Other field tests have shown similar improvement in downstream transmission tests:

| Bridgetap length | Transmission rate without adaptor | Transmission rate with adaptor |
| --- | --- | --- |
| 550' | 166 kb/s | 512 kb/s |
| 470' | 96 kb/s | 632 kb/s |
| 320' | 0 kb/s | 566 kb/s |

These test show that transmission rates for downstream data increases by approximately 350-550 kb/s.

Figure 3:
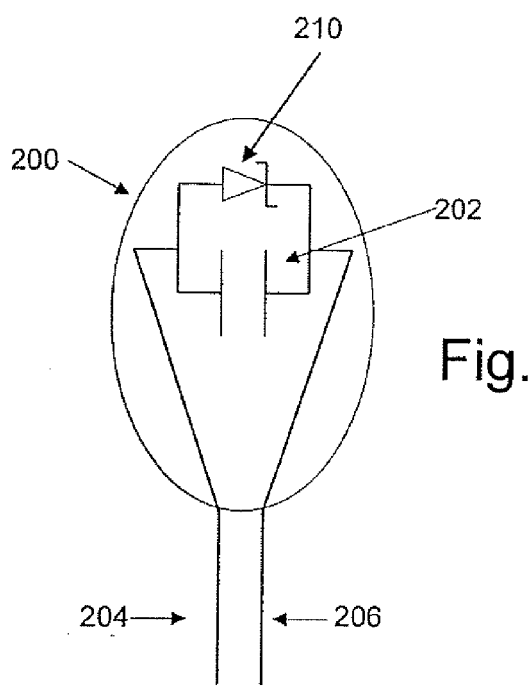
FIG. 3 is a schematic drawing of an adaptor of another embodiment of the present invention.

To endure outdoor conditions (and particularly a lightning strike), capacitor 202 preferably has a voltage rating of at least 500 v. However, voltage ratings as low as 150 v will operate effectively. In the alternative, referring to FIG. 3, a zener diode or other similar solid state protective device 210, can be placed in parallel with capacitor 202 to provide voltage protection. This allows for capacitors with lower voltage ratings.

Tests performed by the inventor have shown that use of the present invention, while increasing downstream rates, will reduce upstream transmission rates by 15-30%. Nonetheless, as the downstream rate is the primary factor by which DSL speed is measured, marketed, sold and considered in view of FCC minimum requirements, the loss of upstream speed is believed acceptable in view of the improvement in downstream speed.

Figure 4:
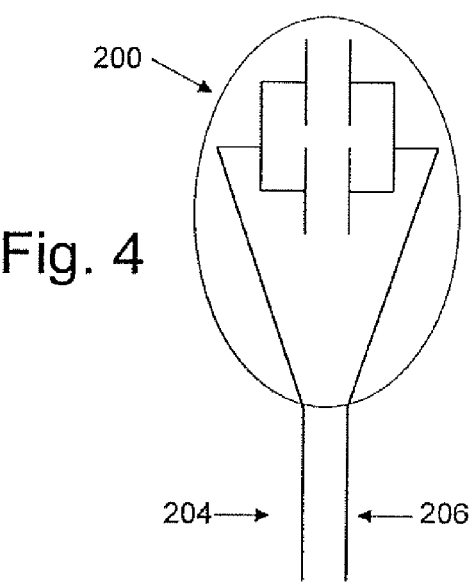
FIG. 4 is a schematic drawing of an adaptor of another embodiment of the present invention.

Although the present invention has been described with reference to a single capacitor 202, the invention is not so limited. As is well known in the art, several capacitors can be arranged in series, parallel, or a combination therewith. FIG. 4 is an example of such a configuration. So long as the total equivalent capacitance of adaptor 200 is within the ranges disclosed herein, the exact number and/or position of capacitors is unlimited.

Preferably, an adaptor according to the present invention will be attached to an exposed end of the bridgetap. However, the invention is not so limited, and may be placed downstream within several feet from the end of one or more of the wires that comprises the bridgetap. As used herein, the recitation that the adaptor is connected "adjacent" or "in proximity" to the end of the bridgetap is intended to include the end itself, as well as several feet proximate the end.

By the use of the present invention, DSL transmission speed can be improved quickly and relatively inexpensively compared with sending a crew to dig up the bridgetap. Since the apparatus and method herein do not require severing the bridgetap, it can remain in place for future use.

It is noted that the foregoing examples have been provided merely for the purpose of explanation and are in no way to be construed as limiting to the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A digital signal line echo reduction adaptor, configured to connect adjacent to a first end of a bridgetap line having a second end connected to a carrier communication line, and configured to reduce an effect of echo from the bridgetap line on a rate of data transmission over the carrier communication line,
wherein an impedance value of the adaptor, when connected adjacent to the first end of the bridgetap line, is selected to result in a resonance characteristic for the combined adaptor and bridgetap line of an equivalent longer bridgetap line of the same gauge.

2. The adaptor of claim 1,
wherein said adaptor comprises at least one capacitor that provides the adaptor with an equivalent capacitance between 0.04-2.0 mf.

3. The adaptor of claim 2,
wherein the equivalent capacitance is approximately 0.05 mf.

4. The adaptor of claim 2,
wherein the equivalent capacitance is approximately 0.068 mf.

5. The adaptor of claim 2,
wherein the at least one capacitor comprises a plurality of capacitors arranged in series.

6. The adaptor of claim 2,
wherein the at least one capacitor comprises a plurality of capacitors arranged in parallel.

7. The adaptor of claim 1,
wherein a length of the bridgetap line is between 250-650 feet.

8. The adaptor of claim 1,
wherein said adaptor changes the resonance characteristic of the bridgetap line to that of an equivalent bridgetap line at least 300 feet longer.

9. The adaptor of claim 1,
wherein said adaptor changes the resonance characteristic of the bridgetap line to that of an equivalent bridgetap line at least 400 feet longer.

10. The adaptor of claim 1,
wherein the bridgetap line splices into the carrier communication line within 1000 feet from a user terminal.

11. The adaptor of claim 1,
wherein said adaptor improves the rate of data transmission by at least 300 kb/s.

12. The adaptor of claim 1,
wherein said adaptor improves the rate of data transmission by 300-566 kb/s.

13. The adaptor of claim 2,
wherein the at least one capacitor has a voltage rating of at least 150 volts.

14. The adaptor of claim 1,
wherein said adaptor is water-tight.

15. The adaptor of claim 1,
wherein the first end of the bridgetap line is above a surface level.

16. The adaptor of claim 1,
wherein the second end of the bridgetap line is below a surface level.

17. The adaptor of claim 1,
wherein said adaptor comprises a capacitor and a diode placed in parallel with the capacitor.

18. A method for reducing digital signal line echo, comprising:
connecting an adaptor adjacent to a first end of a bridgetap line having a second end connected to a carrier communication line; and
reducing an effect of echo from the bridgetap line on a rate of data transmission over the carrier communication line,
wherein an impedance value of the adaptor, when connected adjacent to the first end of the bridgetap line, is selected to result in a resonance characteristic for the combined adaptor and bridgetap line of an equivalent longer bridgetap line of the same gauge.

19. The method of claim 18,
wherein the resonance characteristic of the bridgetap line of the equivalent longer bridgetap line is characteristic of a bridgetap line longer than 650 feet.

20. The method of claim 18,
wherein digital signal line service is provided to a user terminal over the carrier communication line.

* * * * *